(12) United States Patent
Heath

(10) Patent No.: US 11,540,576 B1
(45) Date of Patent: *****Jan. 3, 2023

(54) HEAD AND NECK RESTRAINING SYSTEM

(71) Applicant: NecksGen, Inc., El Cajon, CA (US)

(72) Inventor: Kevin Brian Heath, El Cajon, CA (US)

(73) Assignee: NecksGen Inc., El Cajon, CA (US)

(\*) Notice: Subject to any disclaimer, the term of this patent is extended or adjusted under 35 U.S.C. 154(b) by 283 days.

This patent is subject to a terminal disclaimer.

(21) Appl. No.: 17/029,225

(22) Filed: Sep. 23, 2020

Related U.S. Application Data

(63) Continuation of application No. 16/012,213, filed on Jun. 19, 2018, now Pat. No. 10,786,030, and a continuation-in-part of application No. 14/090,185, filed on Nov. 26, 2013, now Pat. No. 10,039,337.

(60) Provisional application No. 61/797,023, filed on Nov. 27, 2012.

(51) Int. Cl.
*A41D 13/05* (2006.01)
*A42B 3/04* (2006.01)
*B60R 22/00* (2006.01)
*A42B 3/08* (2006.01)

(52) U.S. Cl.
CPC ........ *A42B 3/0473* (2013.01); *A41D 13/0512* (2013.01); *B60R 22/001* (2013.01); *A42B 3/085* (2013.01)

(58) Field of Classification Search
CPC .... A41D 13/0512; A42B 3/0473; A42B 3/08; A42B 3/085; A42B 3/142; A42B 3/147; B60R 22/001; B60R 2021/022; B60R 2021/0048; B60R 2022/027

USPC ............................................. 2/338, 421, 468
See application file for complete search history.

(56) References Cited

U.S. PATENT DOCUMENTS

| | | | | |
|---|---|---|---|---|
| 602,609 | A * | 4/1898 | Tatro ...................... | B62M 23/00 280/230 |
| 1,144,150 | A * | 6/1915 | Marcovsky .......... | A41D 13/018 2/466 |
| 2,040,533 | A * | 5/1936 | Rogers ................... | B64D 17/30 244/151 R |
| 2,475,631 | A * | 7/1949 | Miller .................... | B64D 17/30 244/151 R |
| 2,519,352 | A * | 8/1950 | Carroll ................... | B64D 17/30 244/151 R |
| 2,643,836 | A * | 6/1953 | Carroll ................... | B64D 17/30 244/151 R |

(Continued)

FOREIGN PATENT DOCUMENTS

WO    WO-2009133524 A1 * 11/2009  ......... A41D 13/0512

*Primary Examiner* — Jameson D Collier
(74) *Attorney, Agent, or Firm* — Atlanta Technology Law

(57) ABSTRACT

A head and neck restraining system includes a helmet, a neck brace structure, and a tether system. The neck brace structure includes a neck extension that is attached to shoulder extensions. The tether system includes at least one ring structure that is configured to attach to the helmet and a single tether material that slides through the at least one ring. The single tether material is guided along the neck extension and attached to the shoulder extensions. The at least one ring structure is positioned between the neck and shoulder extensions along the single tether material and splits the load on the helmet to the neck extension and the shoulder extension along to the single tether material created by exerted forces.

13 Claims, 4 Drawing Sheets

(56) References Cited

U.S. PATENT DOCUMENTS

| | | | | |
|---|---|---|---|---|
| 3,072,946 A * | 1/1963 | La Falce | ............... | A47K 7/022 2/338 |
| 3,074,669 A * | 1/1963 | Bohlin | ................. | B64D 25/02 244/122 AG |
| 3,099,261 A * | 7/1963 | Josephh | ................. | B64G 6/00 244/122 B |
| 3,134,106 A * | 5/1964 | Shaffer | ............... | A42B 3/0473 2/468 |
| 3,148,375 A * | 9/1964 | Jones | ................. | A42B 3/0473 473/208 |
| 3,278,230 A * | 10/1966 | Boyce | ................... | B64D 25/02 600/20 |
| 3,329,464 A * | 7/1967 | Barwood | ............. | B64D 25/02 244/122 B |
| 3,499,681 A * | 3/1970 | O'Neal | ................. | B60R 22/26 297/484 |
| 3,514,784 A * | 6/1970 | McDavid | ........... | A63B 71/1291 2/463 |
| 3,524,279 A * | 8/1970 | Adams | ............... | A01G 9/0295 47/87 |
| 3,559,932 A * | 2/1971 | Ternes | ................. | B64D 17/30 244/151 R |
| 3,632,066 A * | 1/1972 | Brown | ................. | B64D 17/38 244/151 A |
| 3,671,974 A * | 6/1972 | Sims | ................... | A42B 3/0473 2/421 |
| 3,818,509 A * | 6/1974 | Romo | ................. | A42B 3/0473 2/909 |
| 3,848,270 A * | 11/1974 | Rand | ...................... | A41F 9/002 2/919 |
| 3,873,996 A * | 4/1975 | Varteressian | ........ | A42B 3/0473 2/421 |
| 3,900,896 A * | 8/1975 | Ackerman | ......... | A63B 71/1291 2/468 |
| 3,925,822 A * | 12/1975 | Sawyer | ............... | A42B 3/0473 2/421 |
| 4,219,193 A * | 8/1980 | Newman | ............. | A63B 23/025 602/17 |
| 4,319,362 A * | 3/1982 | Ettinger | ................ | A63B 71/10 2/415 |
| 4,477,041 A * | 10/1984 | Dunne | ................ | A42B 3/0473 297/475 |
| 4,570,974 A * | 2/1986 | Dove | ..................... | B60R 22/14 297/484 |
| 4,625,335 A * | 12/1986 | Vinai | .................. | A41D 13/0007 2/310 |
| 4,638,510 A * | 1/1987 | Hubbard | ................ | B60N 2/80 2/6.1 |
| 4,731,882 A * | 3/1988 | Ekman | ................ | A62B 35/0031 2/69 |
| 4,909,459 A * | 3/1990 | Patterson | ............. | B60R 22/001 244/122 AG |
| 4,923,147 A * | 5/1990 | Adams | ................ | B64D 25/10 244/122 AG |
| 4,967,985 A * | 11/1990 | Deakin | ................ | A42B 3/0473 244/122 AG |
| 5,080,191 A * | 1/1992 | Sanchez | ............... | A47D 13/086 280/801.1 |
| 5,267,708 A * | 12/1993 | Monson | ................ | A42B 3/0473 244/122 AG |
| 5,272,770 A * | 12/1993 | Allen | ................... | A42B 3/0473 2/468 |
| 5,301,371 A * | 4/1994 | Chao | ................. | A41D 13/0007 280/801.1 |
| 5,313,669 A * | 5/1994 | Rasdell | ................ | A41F 17/00 2/112 |
| 5,437,613 A * | 8/1995 | Reggio | ................ | A42B 3/0473 D29/101.1 |
| 5,620,215 A * | 4/1997 | Janeway | ............... | E05C 19/186 292/288 |
| 5,715,541 A * | 2/1998 | Landau | ................ | A41D 13/05 2/410 |
| 5,738,046 A * | 4/1998 | Williams | ............ | A41D 13/0007 119/770 |
| 5,807,218 A * | 9/1998 | Nagatomo | ....... | A63B 21/00043 128/869 |
| 5,983,463 A * | 11/1999 | Prentkowski | ...... | A44B 11/2557 24/171 |
| 6,006,860 A * | 12/1999 | Bell | .................... | A62B 35/0025 182/18 |
| 6,009,566 A * | 1/2000 | Hubbard | ............. | A41D 13/0512 2/468 |
| 6,125,966 A * | 10/2000 | Jones | ................... | A62B 35/0018 182/6 |
| 6,128,782 A * | 10/2000 | Young | ................. | A62B 35/0018 244/151 R |
| 6,308,345 B1 * | 10/2001 | Williams, Jr. | ...... | A41D 13/0512 602/17 |
| 6,330,722 B1 * | 12/2001 | Betts | .................... | B64D 25/02 2/416 |
| 6,381,758 B1 * | 5/2002 | Roberts, II | ........... | A42B 3/0473 2/468 |
| 6,405,685 B1 * | 6/2002 | Cox | ................... | A62B 35/0031 119/857 |
| 6,428,043 B1 * | 8/2002 | Wooten | ................... | B60R 21/02 2/416 |
| 6,499,149 B2 * | 12/2002 | Ashline | ................. | B60R 22/001 297/464 |
| 6,588,022 B1 * | 7/2003 | Anders | ..................... | A42B 3/30 2/424 |
| 6,591,430 B1 * | 7/2003 | Sledge | ................. | A42B 3/0473 2/468 |
| 6,619,751 B1 * | 9/2003 | Shah | ....................... | B60R 21/02 297/216.12 |
| 6,751,809 B1 * | 6/2004 | Cooper | ................. | B60R 22/001 2/421 |
| 6,810,535 B1 * | 11/2004 | Moloney | .............. | A42B 3/0473 2/468 |
| 6,813,782 B2 * | 11/2004 | Kintzi | .................. | A42B 3/0473 2/421 |
| 6,871,360 B1 * | 3/2005 | Ashline | ................. | A42B 3/0473 2/468 |
| 6,931,669 B2 * | 8/2005 | Ashline | ................. | B60R 22/001 280/801.1 |
| 7,017,194 B2 * | 3/2006 | Schroth | ................ | B60R 22/02 297/484 |
| D522,178 S * | 5/2006 | Ashline | ..................... | D29/101.1 |
| 7,120,982 B2 * | 10/2006 | Downing | ............. | A42B 3/0473 29/434 |
| 7,155,747 B2 * | 1/2007 | Baker | ................... | A42B 3/0473 2/421 |
| 7,380,290 B2 * | 6/2008 | Mothaffar | ............ | A42B 3/0473 2/421 |
| 7,395,558 B2 * | 7/2008 | Mothaffar | ............ | A42B 3/0473 2/421 |
| 7,404,402 B2 * | 7/2008 | Yu | ............................ | A61F 9/029 128/857 |
| 7,509,691 B1 * | 3/2009 | Wingate | ................ | A42B 3/0473 2/421 |
| D597,212 S * | 7/2009 | Stiles | ............................ | D24/191 |
| 7,703,150 B2 * | 4/2010 | Wagner | .................. | A41D 11/00 2/102 |
| 7,703,152 B2 * | 4/2010 | Rhodes | ................... | B60R 22/00 2/421 |
| D631,167 S * | 1/2011 | Leatt | ............................ | D24/191 |
| D649,649 S * | 11/2011 | Leatt | ............................ | D24/191 |
| 8,272,074 B1 * | 9/2012 | Ashline | ................. | B60R 22/001 2/421 |
| 2001/0002087 A1 * | 5/2001 | Townsend | ............. | B60R 22/001 297/480 |
| 2002/0043831 A1 * | 4/2002 | Alsup | .................... | B60N 2/80 297/216.12 |
| 2003/0045408 A1 * | 3/2003 | Seles | ................... | A63B 21/4013 482/121 |
| 2005/0015858 A1 * | 1/2005 | Ashline | ................. | A62B 9/04 2/421 |
| 2005/0204457 A1 * | 9/2005 | Stiles | ................... | A41D 13/0512 2/425 |

(56) References Cited

U.S. PATENT DOCUMENTS

| | | | | |
|---|---|---|---|---|
| 2005/0206151 A1* | 9/2005 | Ashline | ........... | B60R 22/001 |
| | | | | 280/801.1 |
| 2007/0067896 A1* | 3/2007 | Sargent | ........... | B64D 10/00 |
| | | | | 2/468 |
| 2008/0256684 A1* | 10/2008 | Ashline | ........... | B60R 22/001 |
| | | | | 2/468 |
| 2010/0088809 A1* | 4/2010 | Leatt | ........... | A61F 5/055 |
| | | | | 2/468 |
| 2010/0107310 A1* | 5/2010 | Taylor | ........... | A41F 9/002 |
| | | | | 2/311 |
| 2010/0229290 A1* | 9/2010 | Nelson | ........... | A42B 3/0473 |
| | | | | 2/468 |
| 2010/0286580 A1* | 11/2010 | Leatt | ........... | A61F 5/055 |
| | | | | 602/18 |
| 2010/0306902 A1* | 12/2010 | Bourque | ........... | A41D 27/08 |
| | | | | 2/244 |
| 2011/0092347 A1* | 4/2011 | Kassel | ........... | A63B 21/0552 |
| | | | | 482/121 |
| 2012/0137418 A1* | 6/2012 | Nelson | ........... | B60R 22/00 |
| | | | | 2/468 |

\* cited by examiner

HEAD AND NECK RESTRAINING SYSTEM

CROSS REFERENCE TO RELATED APPLICATIONS

This application is a continuation-in-part of co-pending U.S. application Ser. No. 14/090,185 filed on Nov. 26, 2013, which claims priority to U.S. provisional application entitled, "Tension Neutralizing Tether," having Ser. No. 61/797,023, filed on Nov. 27, 2012, both of which are fully incorporated herein by reference.

TECHNICAL FIELD

The present disclosure is generally related to a safety system and, more particularly, is related to systems and methods for reducing the force exerted on a user's head and neck in a restrained torso condition in event of an accident.

BACKGROUND

A helmet is typically worn to protect the head from injuries, especially in high speed competition or recreational vehicles such as race cars, aircraft, boats etc. In low or high speed conditions, a head and neck restraining system can be implemented to reduce forces exerted on a driver's (user's) head and neck, in event of an accident. For example, in U.S. Pat. Nos. 4,638,510, 6,009,566, and 7,017,194, a head and neck restraining system includes a stiff U-shaped shoulder yoke with a high collar that is tethered to a user's helmet by at least one tether. Each tether is attached to the helmet and the high collar in a horizontal plane, resulting in a lateral load transfer and creating a condition where the helmet and the head and neck restraint is cantilevered at the tether-helmet attachment points.

Desirable in the art is an improved head and neck restraining system that would improve upon the conventional head and neck restraining system.

SUMMARY

A new head and neck restraining system is disclosed herein. The system includes a helmet, a neck brace structure, and a tether system. The neck brace structure includes a neck extension that is attached to shoulder extensions. The tether system includes at least one ring structure that is configured to attach to the helmet and a single tether material that slides through the at least one ring. Optionally, the range of motion that the tether is permitted to slide may be limited by a stop formed by stitching the tether to itself. The single tether material is guided along the neck extension and attached to the shoulder extensions. There is at least one ring structure positioned between the neck and shoulder extensions along the single tether material and splits the load from the helmet to the neck extension and the shoulder extension along to the single tether material.

Other systems, devices, and features of the invention will be or will become apparent to one skilled in the art upon examination of the following figures and detailed description. It is intended that all such systems, devices, and features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of a tethering system are provided to explain the manner in which the force exerted on a user's head and neck is reduced.

Figure 1:
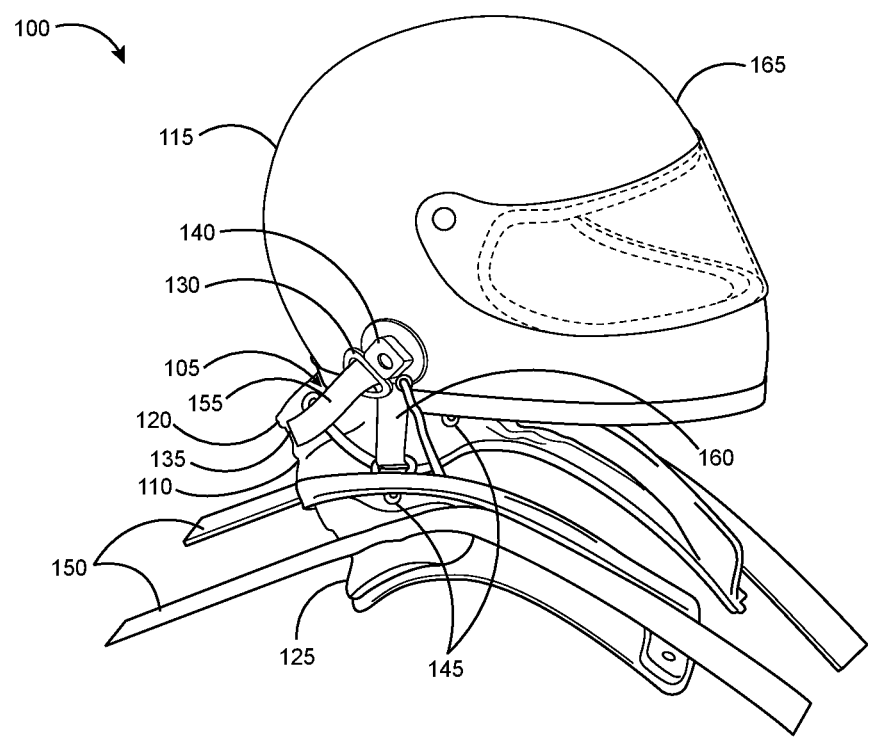
FIG. 1 is a side view that illustrates an embodiment of a neck and head system having a tethering system and a neck brace structure.

FIG. 1 is a side view that illustrates an embodiment of a neck and head system 100 having a tethering system 105 and a neck brace structure 110. The tethering system 105 tethers a helmet 115 to the neck brace structure 110. The helmet 115 is a structure that a head of a user is enclosed therein. The helmet 115 can restrain the head under high impact or load when tethered to a neck brace, held in place by the seatbelts. The neck brace structure 110 is contoured to a user's neck and includes a neck extension 120 that contains the routing channel for the tether. The neck extension 120 is attached to shoulder extensions 125 that are lateral flares with respect to the neck extension 120. The shoulder extensions 125 are contoured and rest on the left and right sides of a user's shoulders in a restrained torso condition in a vehicle with shoulder harness style seatbelt 150. In this example, the shoulder harness style seatbelt incorporating two shoulder belts 150 are placed on top of the shoulder extensions 125.

The tethering system 105 tethers the helmet 115 to the neck brace structure 110. The tethering system 105 includes ring structures 130 that are attached to the helmet 115 by way of, for example, bolts and nuts, integral to the helmet 115 or a latching system. The tethering system 105 further includes a single tether material 135 that slides through the ring structures 130. The range of motion that the tether 135 is permitted to slide through the ring structure 130 may be limited by creating a stop 133 by stitching a first thickness of the tether 135 to a second thickness of the tether 135. The single tether material 135 is a flexible, strong material that can withstand the loads required for this application. This tether material is made from but is not limited to, at least one of the following: KEVLAR® (a type of para-aramid fiber), polyester, nylon webbing, rope, strap and cable.

The single tether material 135 can be guided and slide along the neck extension 120 and is attached to the shoulder extensions 125 via a fixed end mount points 145, such as a bolt and nut. In this example, the single tether material 135 starts and ends on opposite sides of the neck brace structure 110 at fixed end mount points 145. The single tether material 135 wraps around the outer surface near a top portion of the neck extension 120 and is routed through fixed points at the helmet 115 that can be positioned at or near the lower center of the left and right side of the helmet 115.

The fixed end mount points 145 can be positioned at a location of the shoulder extensions 125 that is near the neck extension 120 and above and adjacent to the seatbelts 150. In other words, the fixed end mount points 145 can be positioned to the neck brace structure 110 on the left and the right side at the most forward and lowest position. It should be noted that the closer the fixed end mount points 145 to the seatbelts 150 the more efficient the load transfer is from the helmet 115 to the seatbelts 150. Alternatively or additionally, the fixed end mount points 145 can be positioned at the bottom of the neck extension 120 near the shoulder extensions 125 or anywhere on the shoulder extensions 125. The ring structure 130 is positioned between the neck and shoulder extensions 120, 125 along the single tether material 135 and is attached to the helmet 115 at the fixed points.

The helmet 115 can include rotating buckles 140 at the fixed points that are configured to fasten the ring structure 130 of the tethering system 105 to the helmet 115. The single tether material 135 is guided along the neck extension 120 and routed through the opening of the ring structure 130 that is fastened to the helmet via the rotating buckles 140, allowing the ring structure 130 to move freely with no interference from the rotating buckle 140 under normal conditions of head movement. The ring structure 130 splits the load 155, 160 from the helmet 115 to the neck and shoulder extensions 120, 125 through the single tether material 135. The load 165 on the helmet 115 can be distributed to substantially the entire neck brace structure 110 and can create load paths that split the load on each side of the helmet 115 in halves, for example. The ring structure 130 allows the tethering system 105 to slide as the head and helmet 115 move in the direction of the exerted forces. This has the effect of equalizing the load 160 on the fixed end mount points 145 and the load 105 to each side of 120, creating four equal load paths.

The single tether material 135 is routed through the opening of the ring structure 130 and attached to the fixed end mount 145 on the shoulder extension 125, positioning the ring structure 13 between the neck and shoulder extensions 120, 125. In event of an accident the driver's (user's) body is held in place by the seat belts 150. The neck brace structure is held in place under the left and right shoulder belts of the seat belts. The head of the driver (user) is restrained from moving towards the direction of the impact in an excessive distance from the upper torso by the tethering system 105 that is attached to the neck brace structure 110 and the helmet 115, in effect becoming a seatbelt for the head. The resultant load from the head moving forward is transferred from the helmet 115 to the neck brace structure 110 via the tethering system 105. The tethering system 105 that is attached to the helmet 115 equalizes the load, which is dispersed evenly from the helmet 115 through four load paths 155, 160 on the neck brace structure 110.

Figure 2:
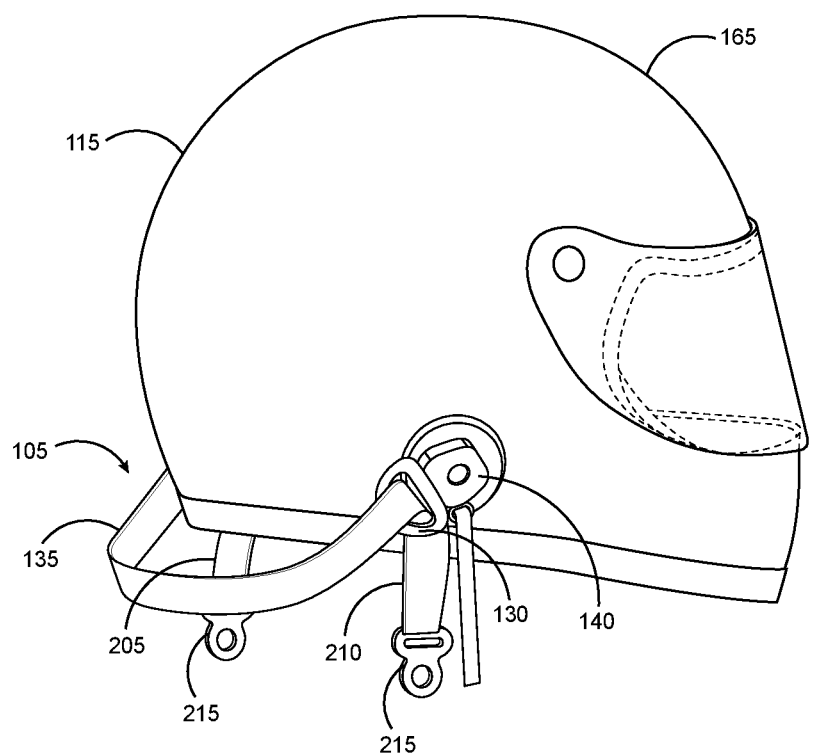
FIG. 2 is a rear side view that illustrates an embodiment of a head and neck tethering system having a tethering system, such as that shown in FIG. 1.

FIG. 2 is a rear side view that illustrates an embodiment of a neck and head system 100 having a tethering system 105, such as that shown in FIG. 1. In this example, the single tether material 135 of the tethering system 105 can be attached to the shoulder extensions 125 of the neck brace structure 110 on each end 205, 210 of the single tether material 135. The ends 205, 210 can be attached with an O-ring tongue 215 that is configured to fasten to fixed end mount points 145 of the shoulder extensions 125, allowing the O-ring tongue 215 to swivel such that the tethering system 105 can self-align in the direction of the force.

By attaching the ends 205, 210 of the single tether material 135 to the left and right shoulder extensions 125, positioning the ring structure 130 between the neck and shoulder extensions 120, 125 and attaching the ring structure 130 to the helmet 115 at the fixed points, the tethering system 105 is a continuous loop between the shoulder extensions 125, creating a double line pulley effect on the ring structure 130 where the loads 155, 160 can be divided in halves.

This arrangement provides four load paths 155, 160 to the neck and head restraining system 100. In a collision, the user's head and helmet 115 are forced in the direction of the impact. The tension can be transferred equally through the shell of the helmet 115 to the ring structures 130 attached at the fixed points on the helmet 115. The load 165 can be split equally from left to right and upper to lower by way of the ring structure 130. A portion of the load 160 is transferred to the fixed end mount points 145 on one of the shoulder extensions 125 and the other portion of the load 155 is transferred to the neck extension 120. This can result in a load 165 that can be distributed equally throughout the single tether material 135 to the neck brace structure 110 and to the seatbelts 150 which encapsulate the neck and head restraining system 100. The load 165 can be distributed in most directions or in any direction that the head and helmet 115 moves forward or sideward.

If the load 165 on the helmet 115 is 4,000 lbs., a load of 2,000 lbs. can be distributed to each sides of the helmet 115. At each side of the helmet, a load 155, 160 of 1,000 lbs. can be distributed to each of the neck and shoulder extensions 120, 125 in a double line pulley by way of the ring structure 130 and then distributed to the seatbelts 150. This feature allows the load 165 to be distributed equally through the four load paths 155, 160 at any angle or direction of the force.

Figure 3:
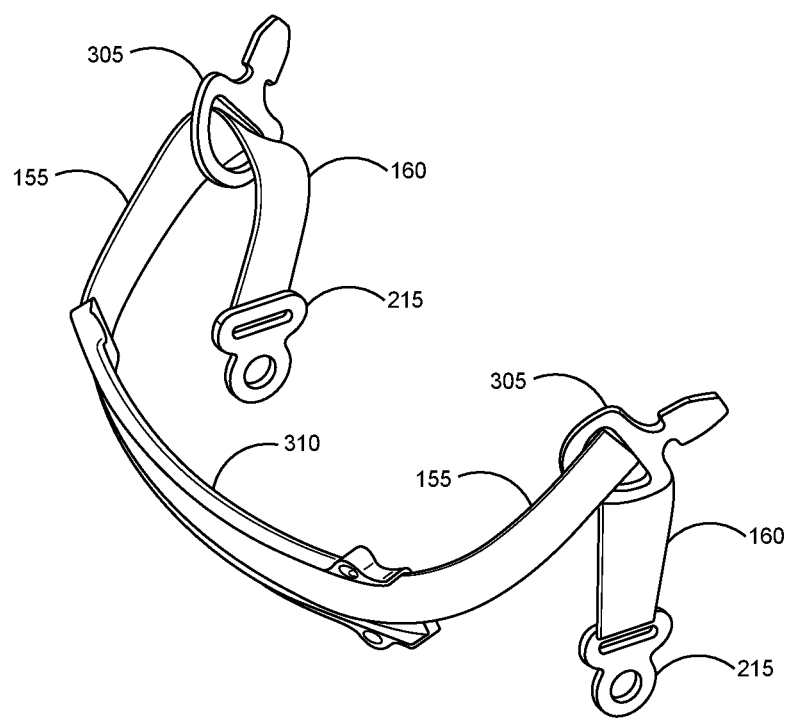
FIG. 3 is a perspective view that illustrates an embodiment of a tethering system, such as that shown in FIG. 2; and, FIG. 4 is a perspective view that illustrates an embodiment of the tethering system with the stops.
Figure 4:
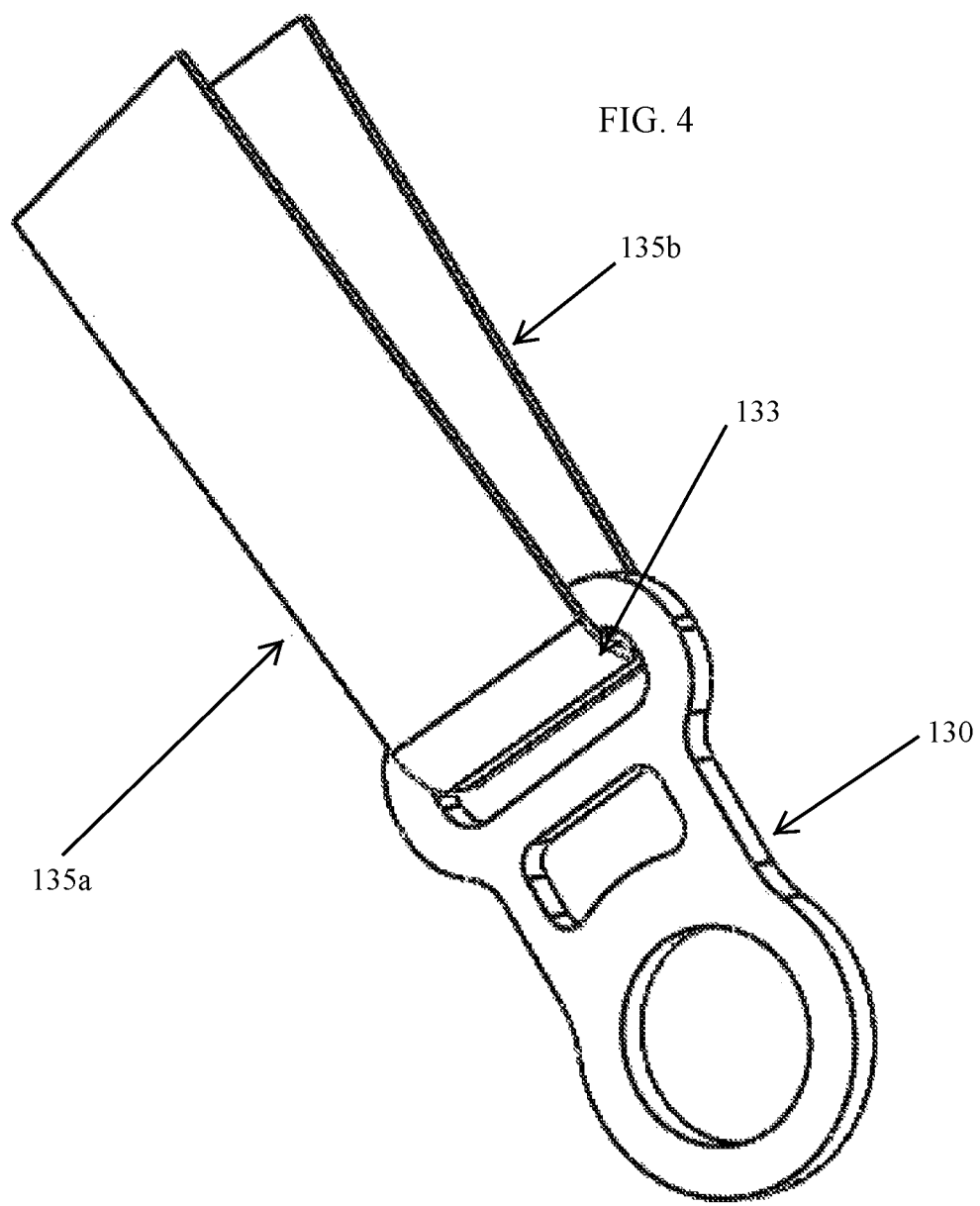

FIG. 3 is a perspective view that illustrates an embodiment of a tethering system 105, such as that shown in FIG. 2. In this example, the ring structure 130 is a D-ring with a tongue 305 that can be attached to the buckle 140 on the helmet 115. The single tether material 135 slides along the neck extension 120 in a tether housing 310 and through the ring structures 130 that can be attached to the neck extension 120, the sliding motion of which allows the tethering system 105 to self-neutralize the tension created by exerted forces. The range of motion that the tether 135 is permitted to slide through the ring structure 130 may be limited by creating a stop 133 by stitching a first thickness 135a of the tether 135 to a second thickness 135b of the tether 135.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

The invention claimed is:

1. A tethering system for use in a head and neck restraining system, the tethering system comprising:

a first ring structure and a second ring structure that are configured to attach to opposite sides of a helmet;

a neck brace structure with a neck extension and a pair of shoulder extensions, the pair of shoulder extensions being contoured and configured to rest on shoulders of a user and are configured to allow respective seat belts to pass over the shoulder extensions, and a single tether material that is configured to slide through the first and second ring structures, wherein a range of motion that the singe tether material can slide through the first and second ring structures is limited by a stop, the stop being comprised by the single tether material; and wherein the single tether material is configured to be guided along the neck extension and is directly attached to a pair of O-ring tongues that are directly attached to the neck extension of the neck brace structure, wherein the first and second ring structures are positioned between the neck extension and the shoulder extensions and are configured to split a force on the helmet to the neck extension and the shoulder extensions along the single tether material when the force is exerted on the helmet.

2. The tethering system as defined in claim 1, wherein the stop is comprised of a stitching of a first thickness of the single tether material to a second thickness of the single tether material.

3. The tethering system as defined in claim 1, wherein each of the first ring structure and the second ring structure is a D-ring with a respective tongue.

4. The tethering system as defined in claim 1, wherein the single tether material has a pair of distal ends, each distal end of the single tether material is configured to attach to an O-ring tongue that is configured to be directly attached to the neck extension of the neck brace structure.

5. The tethering system as defined in claim 4, wherein the shoulder extensions each include at least one fixed end mount point, wherein each end of the single tether material includes an O-ring tongue that is configured to fasten to the at least one fixed end mount point of each of the shoulder extensions, allowing the O-ring tongue to swivel and enabling the tethering system to self-align in the direction of the force.

6. The tethering system as defined in claim 1, wherein the single tether material is a flexible, strong material, the single tether material including at least one of the following: para-aramid fiber, polyester, nylon webbing, rope, strap and cable.

7. The tethering system as defined in claim 1, wherein the single tether material is configured to slide along the neck extension, allowing the tethering system to self-neutralize the tension created by the exerted force.

8. A tethering system for use in a head and neck restraining system, the tethering system comprising:

a first ring structure configured to attach on a left side of a helmet;

a second ring structure configured to attach on a right side of the helmet;

a neck brace structure with a neck extension and a pair of shoulder extensions, the pair of shoulder extensions being contoured and configured to rest on shoulders of a user and are configured to allow respective seat belts to pass over the shoulder extensions;

a single tether that has a first distal end directly attached to a first O-ring tongue that is directly attached to the neck extension, the single tether extends from the first O-ring tongue to the first ring structure, the tether passes through the first ring structure and extends from the first ring structure along a back of the neck extension, the single tether extends from the back of the neck extension to the second ring structure, the single tether passes through the second ring structure and extends from the second ring structure to a second distal end of the single tether that is directly attached to a second O-ring tongue that is directly attached to the neck extension; and wherein the tethering system is configured such that when a force is exerted on the helmet, the force is transmitted to the single tether and is split between the neck extension and the shoulder extensions.

9. The tethering system according to claim 8 wherein the single tether is configured to slide through the first ring structure and the second ring structure to self-neutralize the tension created by the exerted force.

10. The tethering system according to claim 8 wherein the single tether is configured to slide along the back of the neck extension to self-neutralize the tension created by the exerted force.

11. The tethering system according to claim 8, wherein the single tether includes a stop, wherein the single tether is configured to slide through the first ring structure and through the second ring structure, wherein a range of motion that the tether can slide through the first and second ring structure is limited by the stop.

12. The tethering system according to claim 11 wherein the stop is comprised of a stitching of a first single thickness of the single tether to a second single thickness of the single tether.

13. The tethering system according to claim 8 wherein the neck extension is a "U" shaped collar with a pair of legs with a first collar distal end and a second collar distal end, wherein the first O-ring tongue is directly attached to the first collar distal end and the second O-ring tongue is directly attached to the second collar distal end.

* * * * *